United States Patent
Kim

(10) Patent No.: US 10,738,685 B2
(45) Date of Patent: Aug. 11, 2020

(54) APPARATUS FOR INCREASING FLOW RATE IN ENGINE PIPE AND PROCESSING METHOD THEREFOR

(71) Applicant: Gihun Kim, Anyang-si (KR)

(72) Inventor: Gihun Kim, Anyang-si (KR)

( * ) Notice: Subject to any disclaimer, the term of this patent is extended or adjusted under 35 U.S.C. 154(b) by 0 days.

(21) Appl. No.: 15/512,658

(22) PCT Filed: Feb. 26, 2016

(86) PCT No.: PCT/KR2016/001910
§ 371 (c)(1),
(2) Date: Mar. 20, 2017

(87) PCT Pub. No.: WO2016/137265
PCT Pub. Date: Sep. 1, 2016

(65) Prior Publication Data
US 2018/0328266 A1  Nov. 15, 2018

(30) Foreign Application Priority Data
Feb. 26, 2015  (KR) .......................... 10-2015-0027646

(51) Int. Cl.
*B21D 5/16* (2006.01)
*F02B 31/04* (2006.01)
(Continued)

(52) U.S. Cl.
CPC ................ *F02B 31/04* (2013.01); *B21D 5/16* (2013.01); *B21D 51/06* (2013.01); *B21D 53/04* (2013.01);
(Continued)

(58) Field of Classification Search
CPC .......... B21D 5/015; B21D 5/16; B21D 11/20; B21D 51/02; B21D 51/06; B21D 51/12;
(Continued)

(56) References Cited

U.S. PATENT DOCUMENTS

| | | | | |
|---|---|---|---|---|
| 1,455,525 | A * | 5/1923 | Finley | B65D 7/06 220/62 |
| 2,164,966 | A * | 7/1939 | Tutein | A41G 1/04 428/181 |
| 3,039,414 | A * | 6/1962 | Rosanes | B21D 5/02 29/897.35 |
| 3,376,726 | A * | 4/1968 | Molin | B21C 37/205 493/463 |
| 4,001,964 | A * | 1/1977 | Hooker | A63H 33/16 428/9 |
| 4,328,694 | A * | 5/1982 | Beaumont | B21C 37/104 29/525.06 |

(Continued)

FOREIGN PATENT DOCUMENTS

| KR | 10-1997-0705693 | 10/1997 |
|---|---|---|
| KR | 10-1998-0043139 | 8/1998 |

(Continued)

*Primary Examiner* — Edward T Tolan
(74) *Attorney, Agent, or Firm* — Lex IP Meister, PLLC

(57) ABSTRACT

The present invention relates to an apparatus for increasing the flow rate in an engine pipe, and a processing method therefor and, more specifically, to an apparatus for increasing the flow rate in an engine pipe, the apparatus being provided in an engine pipe so as to define a circular flow of a gas by maximizing a circular flow length of the flowing gas, enabling the gas to flow circularly along an outer surface of a flow rate increasing tube body, preventing the occurrence of a vortex due to the collision of the gas flowing in the inside and the outside of the flow rate increasing tube body, and preventing the occurrence of noise and the like since the flow rate increasing tube body is firmly fixed to the pipe.

1 Claim, 5 Drawing Sheets

110

120

130

(51) Int. Cl.
*F15D 1/02* (2006.01)
*F02M 35/10* (2006.01)
*F01N 13/00* (2010.01)
*B21D 51/06* (2006.01)
*B21D 53/04* (2006.01)
*F01N 1/12* (2006.01)

(52) U.S. Cl.
CPC ............... *F01N 1/12* (2013.01); *F01N 13/00* (2013.01); *F01N 13/007* (2013.01); *F02M 35/10* (2013.01); *F02M 35/10262* (2013.01); *F15D 1/02* (2013.01); *F01N 2260/06* (2013.01); *Y02T 10/146* (2013.01)

(58) Field of Classification Search
CPC ..... B21D 53/04; B21C 37/065; B21C 37/286; F01N 13/00; F01N 13/007; F02B 31/04
See application file for complete search history.

(56) References Cited

U.S. PATENT DOCUMENTS

| | | | | |
|---|---|---|---|---|
| 5,216,811 | A | * | 6/1993 | Jackson .................... B60G 7/02 29/898.054 |
| 7,267,098 | B1 | * | 9/2007 | Tasanont ................. F02B 31/04 123/306 |
| 8,651,231 | B1 | * | 2/2014 | McKeeth ............. B21D 41/045 181/227 |
| 2007/0025849 | A1 | * | 2/2007 | Markovic ............... F02B 31/04 415/219.1 |
| 2010/0294237 | A1 | * | 11/2010 | Keegan .................. F02B 31/04 123/306 |

FOREIGN PATENT DOCUMENTS

| | | |
|---|---|---|
| KR | 10-2002-0053305 | 7/2002 |
| KR | 20-2012-0001781 | 3/2012 |
| KR | 10-2014-0105213 | 9/2014 |

* cited by examiner

[FIG. 1]
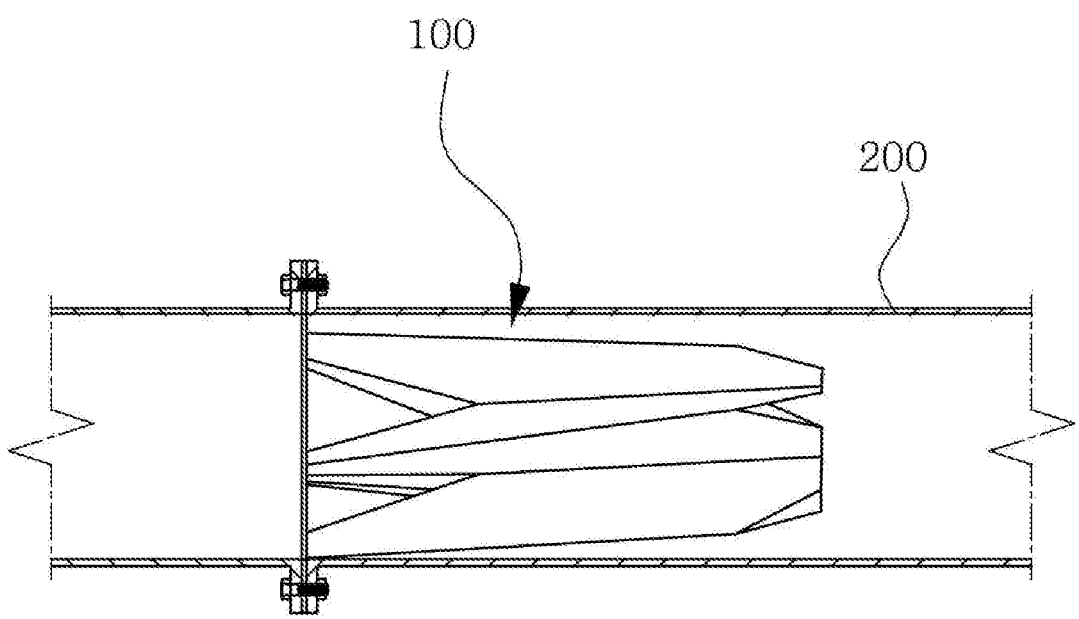

[FIG. 2]
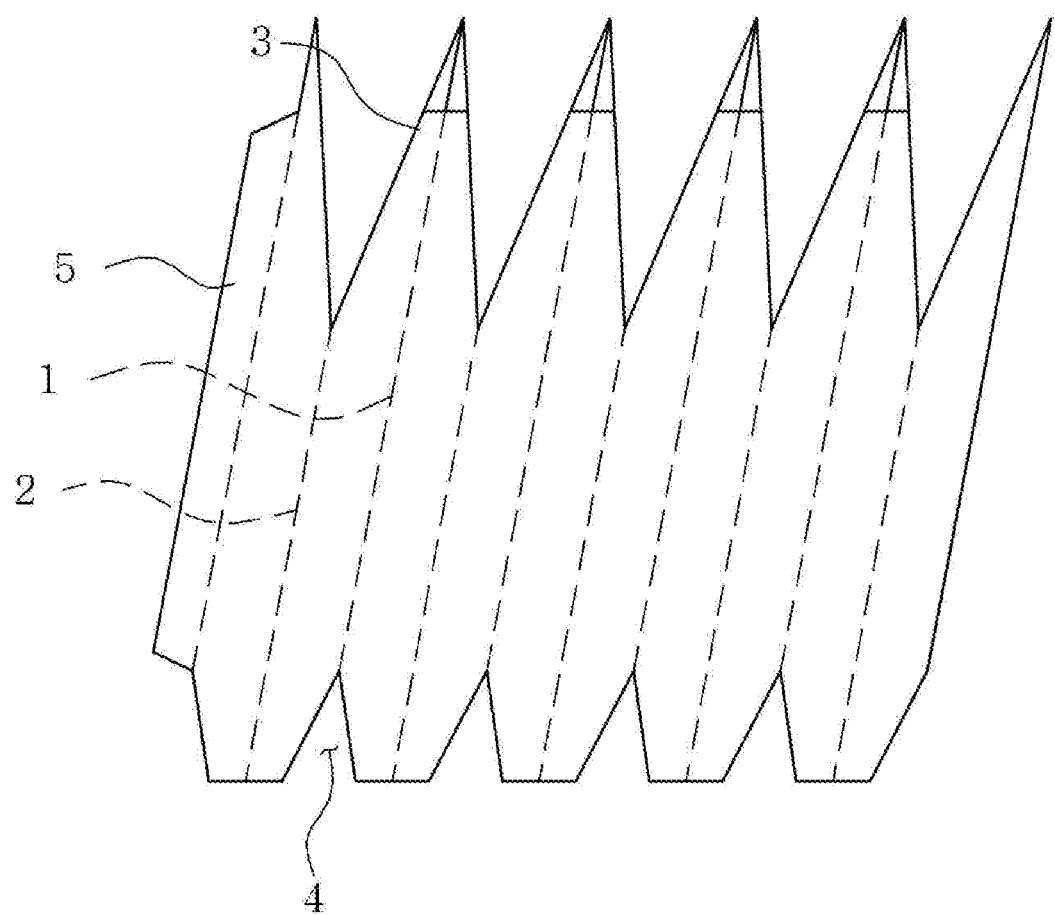

[FIG. 3]
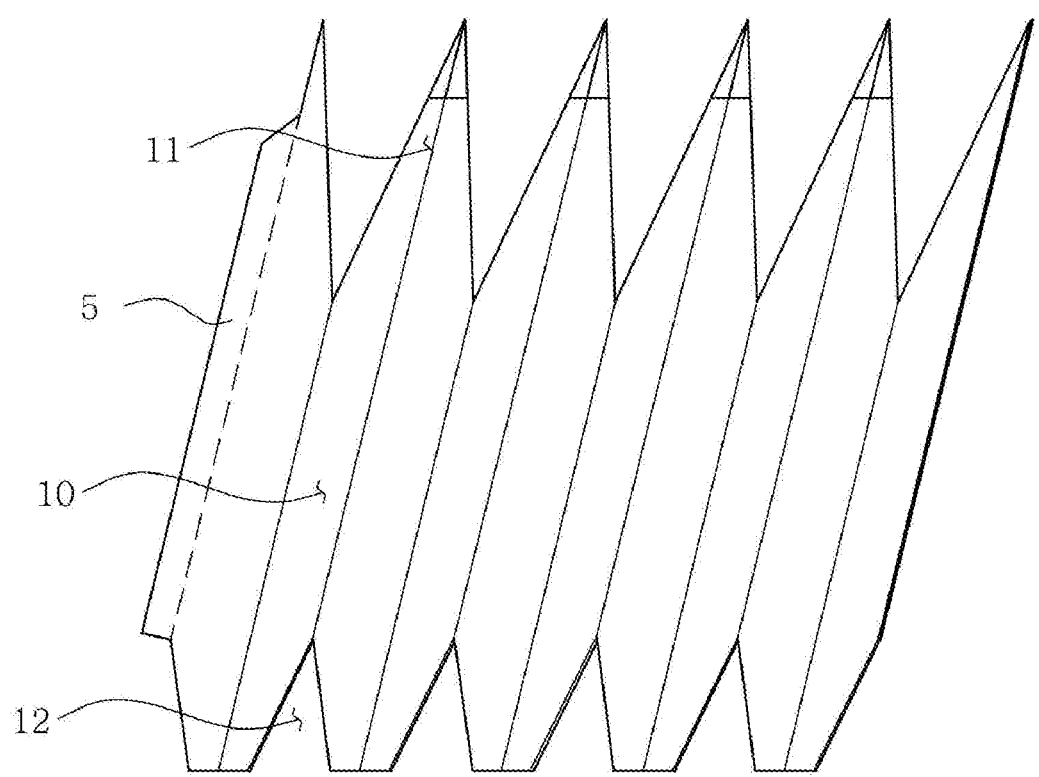

[FIG. 4]
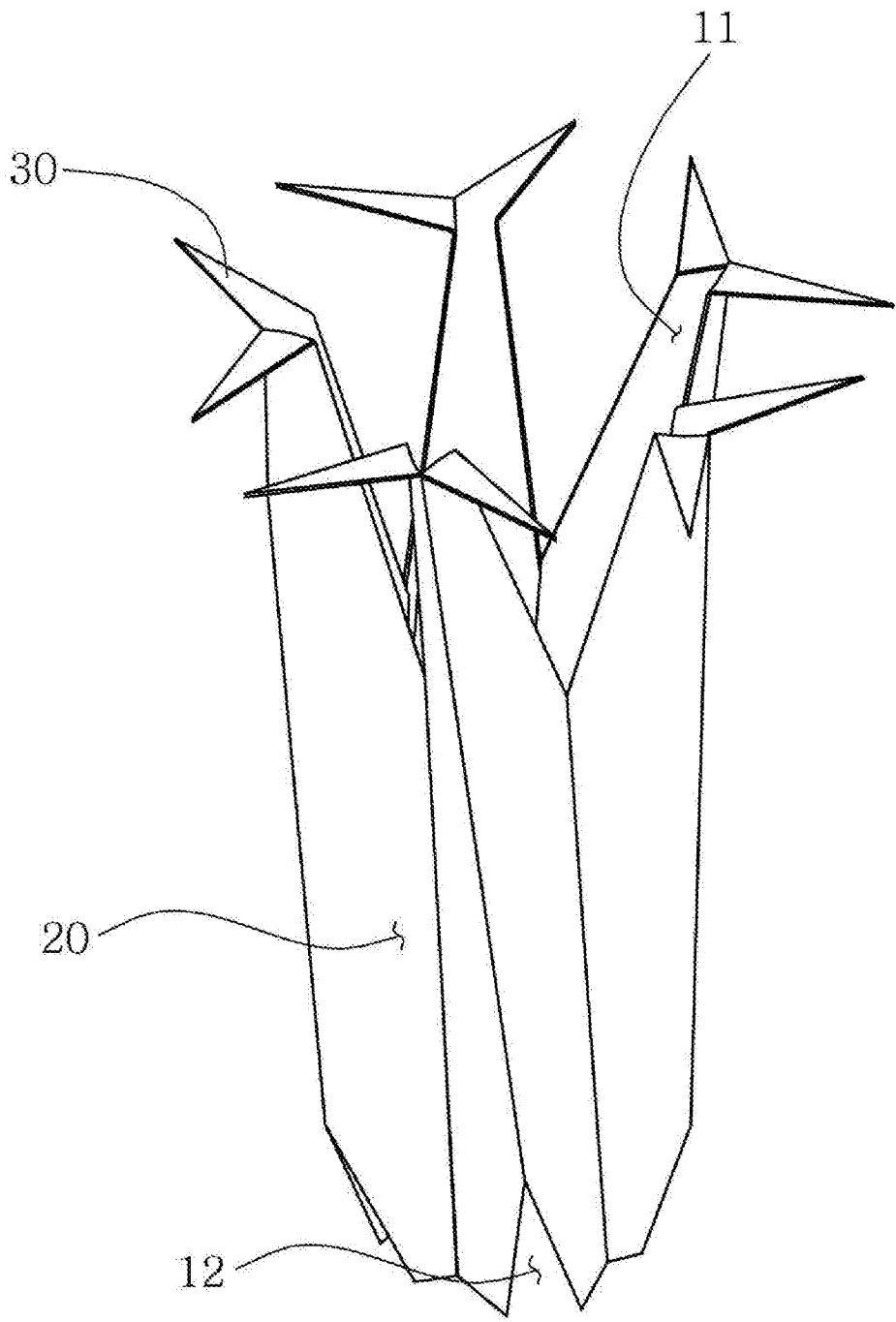

[FIG. 5]
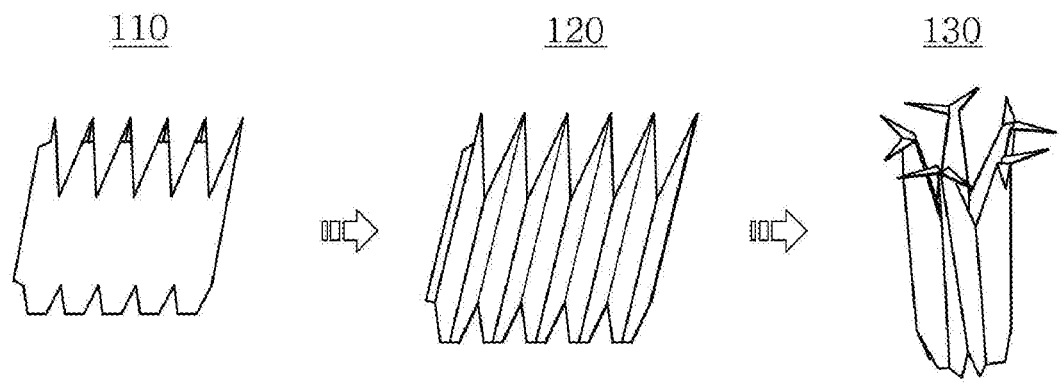

APPARATUS FOR INCREASING FLOW RATE IN ENGINE PIPE AND PROCESSING METHOD THEREFOR

TECHNICAL FIELD

The present invention relates to an apparatus for increasing a flow rate in an engine pipe and a method of processing the same and, more specifically, to an apparatus for increasing the flow rate in an engine pipe, in which the apparatus for increasing the flow rate in an engine pipe includes: a flow rate increasing tube body, in which an elastic board, whose inner diameter is configured to be narrowed toward the direction of a gas flow, is formed by bending; an inner part for a circular flow, which, being comprised of circular flow inducing grooves formed by bending in a helical form is provided at equal intervals so as to circularly flow an air introduced into the inside of the flow rate increasing tube body; a part for inducing gas introduction, in which a circular flow inducing groove is extendedly formed toward a gas inlet, so as to induce the circular introduction of a gas to a side of the gas inlet of the inner part for a circular flow and maximize a circular flow length; an outer part for a circular flow, which, being comprised of circular flow inducing grooves formed by bending in a helical form is provided at equal intervals on the outer surface of the flow rate increasing tube body, so as to induce the circular flow of the gas not introduced into the inside of the flow rate increasing tube body between the inner part for a circular flow from the outer surface of the flow rate increasing tube body, and so as to induce the air at the outer surface from an end of the gas flow releasing direction to a central part thereof; a cut-out part for inducing a centrifugal circular flow, which induces a centrifugal circulatory flow by releasing to the outside the gas, which flows circularly through the outer part for a circular flow at an end toward the direction of gas flow of the outer part for a circular flow and has a centrifugal force, before the end of the direction of gas flow of the circular flow inducing groove of the outer part for a circular flow, so as to prevent the collision of the gas with a gas of the inner part for a circular flow; and a tube body fixing plate, which cuts off the center of an end of a part for inducing gas introduction and bends it to the outside to be held bound to a flange part of an installation pipe, thereby the apparatus being provided in an engine pipe so as to define a circular flow of a gas by maximizing a circular flow length of the flowing gas, enabling the gas to flow circularly along an outer surface of a flow rate increasing tube body, preventing the occurrence of a vortex due to the collision of the gas flowing in the inside and the outside of the flow rate increasing tube body, and preventing the occurrence of noise and the like since the flow rate increasing tube body is firmly fixed to the pipe.

BACKGROUND ART

Generally, vehicles are manufactured such that a linear movement, that is generated when a fuel mixed with an air in an appropriate ratio is inhaled into a cylinder, compressed, ignited, and exploded, is converted into a rotational movement having a torque using a connecting rod and a crank, and thereby the vehicles can be operated by the driving force.

The engines of these vehicles are designed to combust their fuels, whether they are gasolines or diesels, smoothly so that the air introduced from the air filter is purified by the filter, naturally mixed with the fuel being sprayed, and then sprayed into a carburetor or sprayer, thereby providing the locomotive power for the operation of the vehicles.

The combustion gas generated by the ignition of the fuel is collected into one place through an exhaust manifold of an engine, and carbon monoxide, hydrocarbons, nitrogen oxides, etc., are reduced by catalysts while they pass through a catalytic converter, and the combustion gas being introduced into a sub-muffler in a reduced state, passes through a muffler having multiple baffles and thereby the noise becomes reduced and the combustion gas is exhausted to the outside.

However, the exhaust pipe through which the combustion gas passes consists of a simple circular linear pipe and thus the exhaust resistance is directly applied into the inside of the exhaust pipe thereby making a smooth exhaustion of the combustion gas difficult and raising problems such as deterioration in output, increase of fuel cost, loss of engine power itself, etc.

As described above, a smooth exhaust power of a combustion gas in an exhaust apparatus has an important impact on vehicle performances, such as power, fuel efficiency, etc. Conventionally, the exhaust pipe in an exhaust apparatus consisted of a simple linear pipe and thus simply served the role of guiding the exhausted combustion gas to the outside of the vehicle, and thus there was a need for the improvement of a further increase of the exhaust power of the combustion gas for the improvement of the engine power.

Additionally, the insertion of a rifling in a coil spring form into the inside of the exhaust to cause a circulation phenomenon within the inside of an exhaust pipe. However, it was configured such that the combustion gas, that passes through the inside of the exhaust pipe, collides with the rifling and turn along the spring and it only generated a very weak circulation phenomenon. That is, the combustion gas that passes through the core of the coil spring is allowed to freely without a circulation phenomenon, and as a result, the two streams, i.e., a stream of colliding with the rifling and turns around the rifling and a stream that directly passes through the core hinder with each other thereby significantly slowing the flow rate and preventing the generation of an active circulation phenomenon over the entire interior of the exhaust pipe thus having of little effect.

DETAILED DESCRIPTION OF THE INVENTION

Technical Problem

As such, the present invention is to solve the problems of the apparatus for increasing the flow rate installed in the inhalation pipeline or exhaust pipeline in that the circulation flow of a gas is not defined and does not occur actively and thus the mixing of fuels and the release of the exhaust gas cannot be smoothly performed and the installation cannot be easily made.

Technical Solution

That is, the present invention relates to an apparatus for increasing a flow rate in an engine pipe and a method of processing the same and, more specifically, to an apparatus for increasing the flow rate in an engine pipe, in which the apparatus for increasing the flow rate in an engine pipe includes: a flow rate increasing tube body, in which an elastic board, whose inner diameter is configured to be narrowed toward the direction of a gas flow, is formed by bending; an inner part for a circular flow, which, being comprised of circular flow inducing grooves formed by bending in a helical form is provided at equal intervals so as to circularly flow an air introduced into the inside of the flow rate increasing tube body; a part for inducing gas introduction, in which a circular flow inducing groove is extendedly formed toward a gas inlet, so as to induce the circular introduction of a gas to a side of the gas inlet of the inner part for a circular flow and maximize a circular flow length; an outer part for a circular flow, which, being comprised of circular flow inducing grooves formed by bending in a helical form is provided at equal intervals on the outer surface of the flow rate increasing tube body, so as to induce the circular flow of the gas not introduced into the inside of the flow rate increasing tube body between the inner part for a circular flow from the outer surface of the flow rate increasing tube body, and so as to induce the air at the outer surface from an end of the gas flow releasing direction to a central part thereof; a cut-out part for inducing a centrifugal circular flow, which induces a centrifugal circulatory flow by releasing to the outside the gas, which flows circularly through the outer part for a circular flow at an end toward the direction of gas flow of the outer part for a circular flow and has a centrifugal force, before the end of the direction of gas flow of the circular flow inducing groove of the outer part for a circular flow, so as to prevent the collision of the gas with a gas of the inner part for a circular flow; and a tube body fixing plate, which cuts off the center of an end of a part for inducing gas introduction and bends it to the outside to be held bound to a flange part of an installation pipe.

Advantageous Effects of the Invention

Accordingly, the present invention forms an inner part for a circular flow, which, being comprised of circular flow inducing grooves formed by bending is provided at equal intervals so as to circularly flow an air introduced into the inside of the flow rate increasing tube body; and forms a part for inducing gas introduction, in which a circular flow inducing groove is extendedly formed toward a gas inlet, so as to induce the circular introduction of a gas to a side of the gas inlet of the inner part for a circular flow and maximize a circular flow length; thereby clearly defining the gas introduction into the inner part for a circular flow 10, maximizing a circular flow length thereby making the circular flow of the gas more clearly and actively; forms an outer part for a circular flow, which, being comprised of circular flow inducing grooves formed by bending is provided at equal intervals on the outer surface of the flow rate increasing tube body, so as to induce the circular flow of the gas not introduced into the inside of the flow rate increasing tube body between the inner part for a circular flow from the outer surface of the flow rate increasing tube body 0, and so as to induce the air at the outer surface from an end of the gas flow releasing direction to a central part thereof; the gas which is not introduced into the inside of the flow rate increasing tube body consisting of an reducer flows circularly through the outer part for a circular flow formed on the outer surface of the flow rate increasing tube body, and thereby the flow resistance is minimized and the circulatory flow of the gas becomes uniform and defined in the inside and the outside of the flow rate increasing tube body; forms a cut-out part for inducing a centrifugal circular flow, which induces a centrifugal circulatory flow by releasing to the outside the gas, which flows circularly through the outer part for a circular flow at an end toward the direction of gas flow of the outer part for a circular flow and has a centrifugal force, so as to prevent the collision of the gas with a gas of the inner part for a circular flow; the gas which flows through the inner part for a circular flow makes a centrifugal circular flow along the outside before the completion of the circulatory flow of the gas being flowed along the outer part for a circular flow, and therefore, the gases do not collide with each other and the flow is smoothly made without a vortex loss; and by constituting the tube body fixing plate to be held bound to a flange part of an installation pipe by cutting-out the center of the end of the part for inducing gas introduction 11 to be bent to the outside, the installation to the pipeline can be made clearly, easily, and solidly.

BRIEF DESCRIPTION OF DRAWINGS

FIG. 1 shows an illustrative drawing for the use state according to an embodiment of the present invention.
FIG. 2 shows an illustrative drawing for a cut-processed board according to an embodiment of the present invention.
FIG. 3 shows an illustrative drawing for a bending-processed board according to an embodiment of the present invention.
FIG. 4 shows a perspective drawing according to an embodiment of the present invention.
FIG. 5 shows an illustrative process drawing according to the present invention.

BEST MODE FOR CARRYING OUT THE INVENTION

Hereinafter, the present invention will be described in detail with reference to the accompanying drawing.
The present invention enables the gas that flows circularly flows along the inhalation pipeline or exhaust pipe of an engine of a vehicle to flow circularly in a clear and active manner.
That is, the present invention relates to an apparatus for increasing the flow rate in an engine pipe, which includes: a flow rate increasing tube body 100, in which an elastic board, whose inner diameter is configured to be narrowed toward the direction of a gas flow, is formed by bending; an inner part for a circular flow 10, which, being comprised of circular flow inducing grooves formed by bending in a helical form is provided at equal intervals so as to circularly flow an air introduced into the inside of the flow rate increasing tube body 100; a part for inducing gas introduction 11, in which a circular flow inducing groove is extendedly formed toward a gas inlet, so as to induce the circular introduction of a gas to a side of the gas inlet of the inner part for a circular flow 10 and maximize a circular flow length; an outer part for a circular flow 20, which, being comprised of circular flow inducing grooves formed by bending in a helical form is provided at equal intervals on the outer surface of the flow rate increasing tube body 100, so as to induce the circular flow of the gas not introduced into the inside of the flow rate increasing tube body 100 between the inner part for a circular flow 10 from the outer surface of the flow rate increasing tube body 100, and so as to induce the air at the outer surface from an end of the gas flow releasing direction to a central part thereof; a cut-out part for inducing a centrifugal circular flow 12, which induces a centrifugal circulatory flow by releasing to the outside the gas, which flows circularly through the outer part for a circular flow 20 at an end toward the direction of gas flow of the outer part for a circular flow 20 and has a centrifugal force, before the end of the direction of gas flow of the circular flow inducing groove of the outer part for a circular flow 20, so as to prevent the collision of the gas with a gas of the inner part for a circular flow 10; and a tube body fixing plate 30, which cuts off the center of an end of a part for inducing gas introduction 11 and bends it to the outside to be held bound to a flange part of an installation pipe.

Hereinafter, the method for manufacturing the apparatus for increasing the flow rate in an engine pipe is described as follows.

That is, the present invention relates to a method for manufacturing an apparatus for increasing a flow rate in an engine pipe, which includes: a process for cutting a metal board 110; a process for bending a board 120, which bends the metal board cut by the board cutting process to form an inner part for a circular flow 10 and an outer for a circular flow 20; and a process for processing a flow rate increasing tube body 130, which includes forming a metal board, which is cut-processed to form the inner part for a circular flow 10 and the outer for a circular flow 20, into a tube body and forming a tube body binding plate 30.

Here, the process for cutting a metal board 110 includes: forming an inner bending line 1 for the formation of the inner part for a circular flow 10 and an outer bending line 2 for the formation of the outer for a circular flow 20; forming a pipe for inducing gas introduction 3, which forms a triangular shape plate so as to form a part for inducing gas introduction 11 and a tube body binding plate 30 in an upper part of the inner bending line 1, to be extended to an upper side; forming a cutting groove for inducing a centrifugal circular flow 4, which is cut in a triangular shape for the formation of a cut-out part for inducing a centrifugal circular flow 12 on a lower end of the inner bending line 1; and forming a binding plate 5, which is welded to be bound to an end for the formation of a tube body at the other end of a board, by a cutting process.

Additionally, the process for bending a board 120 includes: forming the inner bending line 1 and the outer bending line 2, which are formed in a diagonal line; bending a metal board, which forms a triangular shape plate which forms the part for inducing gas introduction 11 and a triangular shape cut-out part that forms the cut-out part for inducing a centrifugal circular flow 12, along the outer direction being centered on the inner bending line 1; and bending along the inner direction being centered on the outer bending line 2.

Additionally, the process for processing a flow rate increasing tube body 130 includes: processes enabling that the bending-processed board is formed to have a shape that one end there of is formed to be higher than the other end, and when the binding plate 5, which is bending-processed in one side of the bending-processed metal board, is bound to match with the height of the other end with a difference in height, the metal board becomes distorted and a circular flow groove is formed both inside and outside of the flow rate increasing tube body 100, the part for inducing gas introduction 11 at the upper part becomes widened while the lower part becomes narrowed.

Additionally, the center of the end of the part for inducing gas introduction 11 is cut out to be bent to the outside to form the tube body binding plate 30.

Hereinafter, the process of embodying the applications of the present invention will be explained as follows.

As described above, upon the application of the present invention which is comprised of a process for cutting a metal board 110; a process for bending a board 120, which bends the metal board cut by the board cutting process to form an inner part for a circular flow 10 and an outer for a circular flow 20; and a process for processing a flow rate increasing tube body 130, which comprises forming a metal board, which is cut-processed to form the inner part for a circular flow 10 and the outer for a circular flow 20, into a tube body and forming a tube body binding plate 30, thereby enabling the formation of an inner part for a circular flow 10, which, being comprised of circular flow inducing grooves formed by bending, is provided at equal intervals into the inside of the flow rate increasing tube body 100; the formation of a part for inducing gas introduction 11 to a side of the gas inlet of the inner part for a circular flow 10; the formation of an outer part for a circular flow 20, which, being comprised of circular flow inducing grooves formed by bending, is provided at equal intervals on the outer surface of the flow rate increasing tube body 100 between the inner part for a circular flow 10; the formation of a cut-out part for inducing a centrifugal circular flow 12, which induces a centrifugal circulatory flow by releasing to the outside the gas, which is subjected to a circulatory flow at an end toward the direction of gas flow of the outer part for a circular flow 20; and the formation of a tube body fixing plate 30, which cuts off the center of an end of a part for inducing gas introduction 11 and bends it to the outside to be held bound to a flange part of an installation pipe; the gas introduction into the inner part for a circular flow 10 can be defined by the part for inducing gas introduction 11 and the circulatory flow length can be maximized and thus the circulatory flow of the gas can be performed in a defined and active manner.

Additionally, if an embodiment is performed by forming the outer part for a circular flow 20 between the inner part for a circular flow 10, the gas which is not introduced into the inside of the flow rate increasing tube body 100 consisting of an reducer flows circularly through the outer part for a circular flow 20 formed on the outer surface of the flow rate increasing tube body 100, and thereby the flow resistance is minimized and the circulatory flow of the gas becomes uniform and defined in the inside and the outside of the flow rate increasing tube body 100.

Additionally, if an embodiment is performed by forming the cut-out part for inducing a centrifugal circular flow 12 in the inner part for a circular flow 10, the gas which flows through the inner part for a circular flow 10 makes a centrifugal circular flow along the outside before the completion of the circulatory flow of the gas being flowed along the outer part for a circular flow 20, and therefore, the gases do not collide with each other and the flow is smoothly made without a vortex loss.

Additionally, by constituting the tube body fixing plate 30 to be held bound to a flange part of an installation pipe by cutting-out the center of the end of the part for inducing gas introduction 11 to be bent to the outside, the installation to the pipeline can be made clearly, easily, and solidly.

The invention claimed is:

1. A method for manufacturing an apparatus for increasing a flow rate in an engine pipe, comprising:
   a process for cutting a metal board (110);
   a process for bending a board (120), which bends the metal board cut by the board cutting process to form an inner part for a circular flow (10) and an outer part for a circular flow (20); and
   a process for processing a flow rate increasing tube body (130), which comprises forming a metal board, which is cut-processed to form the inner part for a circular flow (10) and the outer part for a circular flow (20), into a tube body and forming a tube body binding plate (30);
   wherein the process for cutting a metal board (110) comprises: forming an inner bending line (1) for the formation of the inner part for a circular flow (10) and an outer bending line (2) for the formation of the outer for a circular flow (20); forming a pipe for inducing gas introduction (3), which forms a triangular shape plate so as to form a part for inducing gas introduction (11) and a tube body binding plate (30) in an upper part of the inner bending line (1), to be extended to an upper side; forming a cutting groove for inducing a centrifugal circular flow (4), which is cut in a triangular shape for the formation of a cut-out part for inducing a centrifugal circular flow (12) on a lower end of the inner bending line (1); and forming a binding plate (5), which is welded to be bound to an end for the formation of a tube body at an end of a board, by a cutting process;

wherein the process for bending a board (120) comprises: forming the inner bending line (1) and the outer bending line (2), which are formed in a diagonal line; bending a metal board, which forms a triangular shape plate which forms the part for inducing gas introduction (11) and a triangular shape cut-out part that forms the cut-out part for inducing a centrifugal circular flow (12), along an outer direction being centered on the inner bending line (1); and bending along an inner direction being centered on the outer bending line (2); and wherein the process for processing a flow rate increasing tube body (130) comprises: bounding the binding plate (5), which is bending-processed in one side of the bending-processed metal board, to match with a height of an opposite side of the bending-processed metal board with a difference in height, by which the metal board becomes distorted, a circular flow groove is formed both inside and outside of the flow rate increasing tube body (100), and the part for inducing gas introduction (11) at the upper part becomes widened while the lower part becomes narrowed; cutting a center of the part for inducing gas introduction (11) from a top end to a depth to form separated end portions; and bending the separated end portions to the outside to form the tube body binding plate (30).

* * * * *